United States Patent [19]

Burr, II

[11] 4,389,425

[45] Jun. 21, 1983

[54] METHOD OF MAKING SOY MILK CONTAINING STABILIZED PROTEIN

[76] Inventor: Jack Burr, II, P.O. Box 789, Dunedin, Fla. 33528

[21] Appl. No.: 272,738

[22] Filed: Jun. 11, 1981

[51] Int. Cl.³ .............................................. A23C 11/10
[52] U.S. Cl. .................................. 426/598; 426/311; 426/634
[58] Field of Search ........................ 426/598, 634, 311

[56] References Cited

U.S. PATENT DOCUMENTS

| | | | |
|---|---|---|---|
| 2,267,747 | 12/1941 | Plews | 426/634 |
| 2,923,628 | 2/1960 | Otto | 426/590 |
| 3,642,494 | 2/1972 | Wagner | 426/634 |
| 3,798,339 | 3/1974 | Peng | 426/580 |
| 3,843,828 | 10/1974 | Arndt | 426/598 |
| 4,072,670 | 2/1978 | Gudnight et al. | 426/598 |
| 4,129,664 | 12/1978 | Kruseman | 426/598 |
| 4,194,018 | 3/1980 | Hodel et al. | 426/580 |
| 4,194,019 | 3/1980 | Yasumatsu et al. | 426/580 |
| 4,259,358 | 3/1981 | Duthie | 426/598 |
| 4,303,692 | 12/1981 | Gaull | 426/634 |

FOREIGN PATENT DOCUMENTS

| | | | |
|---|---|---|---|
| 37-15273 | 9/1962 | Japan | 426/598 |
| 46-3108 | 1/1971 | Japan | 426/598 |
| 51-26250 | 3/1976 | Japan | 426/598 |
| 53-96356 | 8/1978 | Japan | 426/598 |
| 53-133669 | 11/1978 | Japan | 426/598 |
| 13903 | of 1915 | United Kingdom | 426/598 |

OTHER PUBLICATIONS

J. of Food Science, vol. 14, 1976, Nelson et al., p. 57.
Chemical & Engineering News, vol. 21#1, 1/10/46.

*Primary Examiner*—Steven L. Weinstein
*Attorney, Agent, or Firm*—Ronald E. Smith

[57] ABSTRACT

A beverage that may be consumed as a substitute for bovine milk or that may be stabily mixed with bovine milk in any proportion up to 10 days prior to consumption, and a process for making the same.

Soy beans are ground in the presence of an acidified water solution that has a pH that optimizes protein extraction from ruptured bean cells and that insures that the amino acids so extracted will be in cationic form and therefore electrically associated with negatively charged ions supplied by the acidified water solution so that the protein is maintained in suspension and so that the solution is otherwise stabilized. The low pH also inhibits the enzymatic development of "painty", "fishy", and "beany" off-flavors.

The solution is passed through a catalytic reduction means where a heat-absorbing reaction changes the positively charged amino acids into negatively charged ions that enter into electrical association with positively charged ions supplied by an alkaline solution that increases the pH of the solution prior to its entry into said catalytic reduction means so that the amino acids are maintained in suspension in a manner duplicating the manner in which such amino acids are maintained in suspension in bovine milk.

21 Claims, 2 Drawing Figures

METHOD OF MAKING SOY MILK CONTAINING STABILIZED PROTEIN

BACKGROUND OF THE INVENTION

1. Field of the Invention

This invention relates, generally, to a process for synthesizing a beverage having a nutritive composition similar to that of bovine milk, and more specifically relates to such a beverage having soya beans as a primary ingredient thereof.

DESCRIPTION OF THE PRIOR ART

The composition of the prior art that most closely resembles the final product of the inventive method disclosed herein is bovine milk. Both bovine milk and the inventive soy milk have all eight of the essential amino acids, in substantially the same proportions for each amino acid. To illustrate this fact, FIG. 1 plots, for each of the eight essential amino acids, the percentage of such amino acid to the total of all the essential amino acids in the respective beverages; the data for bovine milk being shown in phantom lines, and for the inventive soy milk in solid lines.

Figure 1:
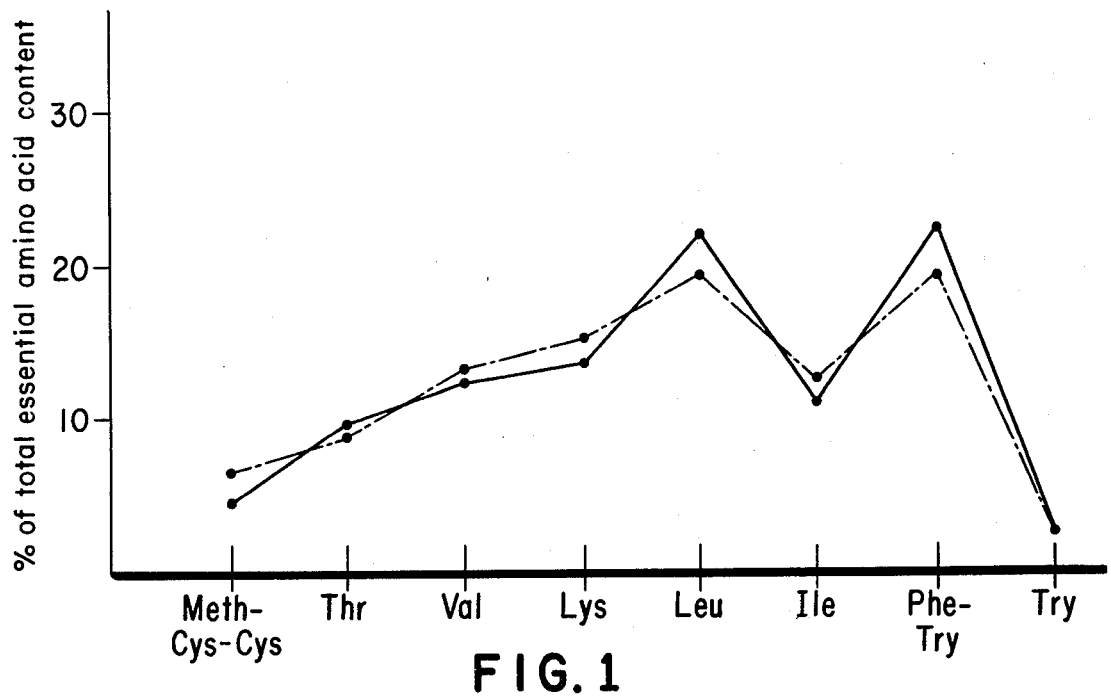
FIG. 1 is a graph showing percentage amino acid content for eight essential amino acids in both bovine and the inventive milk.
Figure 2:
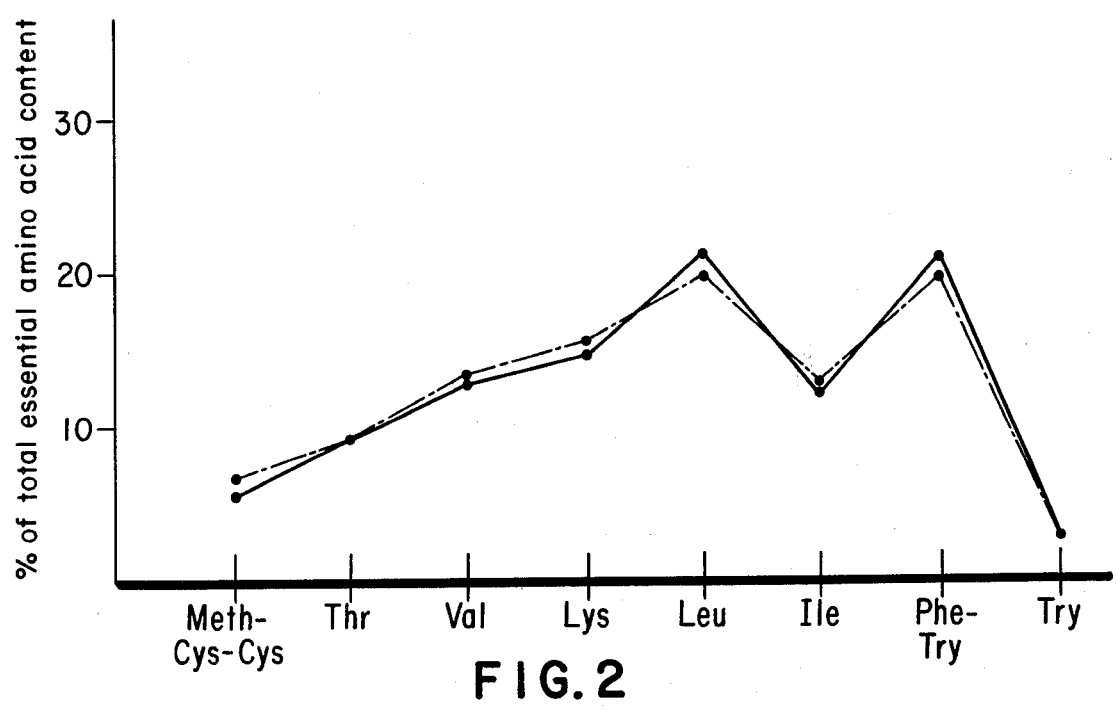
FIG. 2 is a similar graph showing the plotted values for a milk formed by mixing equal parts of bovine and the inventive milk.

When the inventive soy milk is adulterated by mixing it with equal parts of bovine milk, the amino acid profile of the novel soy milk even more closely resembles that of bovine milk, as is apparent from FIG. 2 which has the same phantom line/solid line legend as FIG. 1.

Earlier attempts to provide soy based milk-like beverages are described in the following U.S. Pat. Nos. 4,194,019 to Yasumatsu et. al., 4,194,018 to Hodel et. al., 3,798,339 to Peng, and 2,923,628 to Otto. These patents were found in the course of a patent search, and are therefore representative of efforts in the field of this invention.

Most earlier efforts in this field have relied upon the use of bovine milk by-products, such as skim milk, dairy whey, lactose, lactic acid, and the like, to impart to the final soy-based milk the characteristic flavor, appearance and nutritive composition of bovine milk. As such, these "soy-based" milks are not soy-based at all, but are primarily bovine milk by-products-based beverages having soy beans added thereto.

A very important short-coming of these soy bean containing bovine milk substitutes is the poor ability of these beverages to retain protein in suspension. The soy bean-including bovine milk substitutes that were known prior to this disclosure are known for the protein-containing precipitates which settle out when such beverages are stored even for brief periods of time. Since the soy-including substitutes are initially low in essential amino acid content (especially in the essential amino acid Methionine-Cysteine) their propensity to precipitate proteins further lowers the protein content of these low protein beverages. The prior art is replete with methods designed to prevent this harmful-to-good-health protein precipitation (such as grinding the soy beans into minute particles, followed by furious agitation of the suspension) but such methods have failed. No previously developed soy-based bovine milk substitute may be mixed with bovine milk and stored; the mixture forms curds and whey. Any attempt to fortify previously developed soy-based bovine milk substitutes with calcium immediately produces "TOFU" of soy bean cheese.

Bovine milk maintains protein in suspension by combining amino acids and calcium ions in an electrical association relationship. The prior art methods for making soy including bovine milk substitutes, however, fail to teach or suggest a means whereby the amino acids from the soy beans can be maintained in suspension by association with calcium ions. Nature teaches the desirability of such an electrical association, but the prior art is devoid of suggestions on how to accomplish the desired electrical association.

Methods for making soy-including bovine milk substitutes have also included rather involved, and not entirely successful, means, such as evaporation techniques, for eliminating from the final product the crystallizable protein enzyme that catalyzes the oxidation primarily of unsaturated fatty acids or unsaturated fats by oxygen and secondarily of carotenoids to colorless substances, and that occurs especially in soy beans (lipoxidase). If not effectively eliminated or de-activated, lipoxidase imparts an undesirable flavor to the final product, a flavor that some compare with the flavor of paint or fish.

Little progress has heretofore been made, also, in attempts to eliminate the bean-like flavor of soy-including bovine milk substitutes.

One drawback of bovine milk is its low iron content and its over-abundance of protein, both of which factors militate against its use as a food for infants. It has heretofore been necessary, therefore, to prepare special bovine milk-like formulas having increased iron content and decreased protein content for consumption by infants. Since infants are at center stage in the food crisis drama now being played in the under-developed regions of the world, which regions include a majority of the world's population, there is clearly a need for a bovine milk substitute that matches or exceeds the essential amino acid content of bovine milk, desirably contains less of the non-essential amino acids, and which has an iron content at least equal to that of the prior art bovine milk substitute infant formulas. Such a product would fill a critical void in the world's food supply.

The bovine milk substitute that is needed would maintain fat, protein and inorganic salts, in varying proportion, in suspension and would have a shelf-life at least equal to that of bovine milk. Ideally, the fat suspended therein would be polyunsaturated. The product would have the appearance, texture, flavor, aftertaste and shelf-life of bovine milk to promote its acceptance by the consuming public. The product should be capable of admixing with bovine milk in any preselected proportion, to thereby fortify and improve the nutritive properties of bovine milk, in the absence of protein precipitation or other degradation of the soy milk, the bovine milk, or both. The needed soy based milk would also have chemical properties that would allow it to be fortified with calcium.

A product having these desirable qualities does not appear in the prior art.

SUMMARY OF THE INVENTION

The longstanding but heretofore unfulfilled need for such a product and economical method for producing the same is now fulfilled by the inventive product and process for making such product.

Soya beans are soaked in water, for a predetermined period of time, and blanched to reduce their bean-like flavor. The cells of soy beans are then ruptured, in a grinding process, in the presence of an acidified water solution. The acidified water serves to extract protein and starch from the soy bean cells, and, in conjunction with the afore-mentioned blanching, serves to de-activate the enzyme lipoxidase. The lower pH of the acidified water also serves to prevent the coagulation of the extracted soy proteins by assuring that the amino acids will be found in the positively charged cationic form and therefore electrically associated with negative ions present in the acidified water solution.

A desludging operation separates the cellulose and lignin pulp from the bean slurry, and the pH and density of the remaining liquid is monitored so that such information can be fed back and used to regulate the rate and hence the amount of soaked and blanched beans that are introduced into given quantities of the acidified water solution.

The temperature of the liquid is raised quickly to completely de-activate the undesired enzymes lipoxidase and anti-trypsin, and to gelatinize the starch. The elapsed time and maximum temperatures reached in this step of the inventive process are carefully preselected to accomplish the desired unwanted enzyme-destroying result while preserving the heat-labile amino acids.

After the pH of the liquid has been increased to 8 or greater, by the introduction of an alkaline slurry, the liquid enters a catalytic reduction column wherein two (2) hydrogen ions are stripped from each amino acid molecule in an endothermic reaction. This causes the stripped and therefore negatively charged amino acid molecules to electrically associate with positively charged calcium ions that were initially provided, in calcium hydroxide form, in said pH-raising alkaline slurry.

The remaining steps include sweetening the solution and adjusting its osmotic pressure and freezing point to more closely resemble the corresponding parameters in bovine milk, followed by the addition thereto of vitamins, fats, and other nutrients, homogenizing, pasteurizing, filtering and cooling the solution and adjusting the pH to the desired level.

It is therefore seen to be a primary object of this invention to provide a soy based beverage that resembles bovine milk in substantially all physical, chemical, nutritional and organoleptic respects.

A closely related object is to provide such a beverage that may be consumed in its pure state or combined in any proportion with bovine milk, with shelf-life equal to or greater than that of pure bovine milk.

Another closely related object is to provide such a beverage in ready-to-consume liquid, non-powder form, so that the beverage requires no reconstitution such as dissolving a powder or diluting a concentrate.

Still another object is to provide a nutritive alternative to bovine milk for persons allergic to bovine milk, for persons who object to the consumption of bovine milk or animal products in general, and for persons who refuse to combine milk of animal origin and meat, for religious reasons.

Yet another object is to provide a beverage containing higher levels of the 8 essential amino acids, and greater amounts of vitamins and minerals than does bovine milk, while still providing lower amounts relative to bovine milk, of harmful substances such as cholesterol, saturated fats, xanthine oxidase, strontium ninety, and lactose.

Yet another object is to provide a soy-based beverage containing calcium and protein in a chemical state that is the same as the chemical state in which said calcium and protein are found in bovine milk. ap A further object of the invention that is very closely related to the immediately foregoing object is to provide a beverage having positive calcium ions electrically associated with negatively ionized amino acids, which association is stabilized by phosphates of calcium, as well as by citrates and lactates, just as in bovine milk.

Yet another closely related object is to provide a soy based beverage having a calcium content approximately equal to that of bovine milk in which the calcium does not quickly degrade the beverage by either precipitating as insoluble salt by triggering the coagulation, or precipitation, of the protein, or both.

A more general object of the invention is to provide a soy-based beverage that is a very agreeable substitute for bovine milk in a plurality of domestic applications of the type normally requiring the addition of bovine milk, such as in hot chocolate drinks, instant coffee made with hot milk, pudding, blended milk-based alcoholic beverages, baked goods and the like.

DETAILED DESCRIPTION OF THE PREFERRED EMBODIMENT

A very specific description of the inventive method will now be set forth. The specific parameters that will be set forth are believed to be optimal for the exemplary continuous process to be described, but it should be appreciated that empirical studies may show that other values for the respective parameters are desirable.

U.S. Grade No. 1 soy beans are the preferred primary ingredient for the novel soy milk. The beans are stored in a 10 ton bin and predetermined quantities thereof are continuously carried from the bin, by any suitable conveyor means, to a preparation station where they are cleaned and washed. The cleansed and washed beans are then conveyed to a soak tank where they are allowed to soak for 10 hours in room temperature water. The beans are next conveyed to another tank means where they are blanched by immersion for two (2) minutes in boiling water. Blanching inhibits enzymatic action, in general, and more particularly serves to at least partially de-activate the enzyme lipoxidase which would produce unpleasant flavors and the enzyme anti-trypsin which would otherwise interfere with protein digestion in the alimentary canal.

The novel process employs a servomechanism to precisely control the number of grams per minute of beans that are transported, after blanching, to a first homogenizer or wet mill means where the bean cells are ruptured in the presence of a critically prepared acidified water solution. Upon exiting the first homogenizer means, the bean slurry is desludged and the pH and density of the remaining liquid is continuously monitored.

More specifically, the liquid remaining after the desludging process passes through a pH sensor and a density sensor. These two means are error-sensing and provide feedback to correct the performance, to a desired standard, of a weigh belt that carries the beans, after blanching, to the above-mentioned first homogenizer means.

More particularly, the beans are conveyed, after blanching, to the first homogenizer means by a computer controlled weigh belt. The speed of the weigh belt is variable responsive to feedback information fed into the computer by the pH and density sensors. Those familiar with servomechanisms will appreciate that the hunting phenomena will be observed, and that the continuous feedback of "down-stream" information will provide optimal regulation of the weigh belt.

In this manner, a precisely controlled, optimal number of grams per minute of beans are continuously fed into the first homogenizer means.

As aforesaid, the bean cells are ruptured in the first homogenizer means in the presence of an acidified water solution that is prepared by blending purified, demineralized water and three (3) acids in the following proportions by a process of automatic dosification:

| Acid | Molecular Formula | Amount |
| --- | --- | --- |
| Citric acid food grade powder | $H_3C_6H_5O_7$ | 1.63 gram |
| Hydrochloric acid analytical grade 37.85% by weight | HCl | 5.64 milliliters |
| Phosphoric acid analytical grade 85.6% by weight | $H_3PO_4$ | 1.65 milliliters |
| Water | $H_2O$ | 1000.00 milliliters |

The solution prepared in accordance with the foregoing parameters has a pH of 1.4. A servomechanism operates to regulate the dosing valves, which servomechanism includes an in-line pH sensor. Preferably, the acidified water solution is stored in a first solution tank so that minor variations in pH may be averaged out. A computer controlled modulating valve regulates the flow rate of the acidified water solution from the first solution tank into the first homogenizer tank so that one liter of such acidified water solution is introduced into said first homogenizer tank for every 286 grams of beans introduced thereinto, for example.

A Janke & Kunkle Ultra-Turrax mechanical shear type homogenizer, or equivalent homogenizer, receives said exact proportions of beans and acidified water. The beans are ground therein so that the protein and starch of the beans are released into the acidified water attendant bean cell rupturing. The pH of the acidified water, 1.4, operates to extract from the ruptured bean cells the maximum amount of protein. A pH of 1.0 would extract 25% less protein, whereas a pH of 3.5 would extract 35% less protein. Neutral water, having a pH of 7, would extract not even half as much protein.

Studies have shown that soy protein extracted by less acidic or neutral water will be found to be ionized in the bipolar or zwitterion form. Such zwitterion form is undesirable because protein in such form cannot remain in suspension because it spontaneously clumps, precipitates, or coagulates. Moreover, such solutions cannot be fortified with calcium, since the introduction of calcium thereinto results in the formation of curds.

However, water at pH 1.4 assures that all of the amino acids will be found in the positively charged cationic form and therefore electrically associated, when the three (3) above specified acids are used to acidify the solution, with citrate, cloride, and phosphate ions. This electrical association provides a buffer system that stabilizes the solution by preventing protein precipitation and by resisting pH changes, bacterial activity, and the like. The enzyme lipoxidase is also further deactivated by water having a pH of 1.4.

The discharge from the first homogenizer is a bean slurry which passes first through a flow meter and which is then pumped into a desludging centrifuge where cellulose and lignin pulp is separated from the protein suspension. The pulp is discarded and the liquid passes through the earlier-mentioned pH sensor and density sensor which provides information to the computer which controls the weigh belt conveyor that carries the beans, after blanching, into the first homogenizer tank, as aforesaid. The liquid then enters an accumulation tank.

The desludged liquid is pumped from the accumulator tank through a flow-regulating valve into a heat-exchange type cooker (the operation of which resembles the operation of a Pasteurizer) wherein the temperature of the liquid is quickly elevated to 100 degrees C., under boil-preventing pressure. Immediately following such rapid non-boil-inducing elevation of temperature, the liquid is made to flow through a serpentine-in-configuration tube that is heated by auxiliary means to maintain the 100 degree C. temperature of the liquid. The length of the tube is selected so that a given droplet of liquid traverses such length in four (4) minutes. The temperature, pressure and flow rate of the liquid are continuously monitored during this cooking process by temperature sensors disposed at the inlet and outlet of the serpentine tube, and by pressure and flow rate sensors, respectively.

The pH of the liquid during the cooking process will be about 2.7. The cooking completely deactivates the remaining enzymes lipoxidase and anti-trypsin, and gelatinizes the starch in the liquid, and the time and temperature of the cooking is carefully controlled in the above-described manner so that the heat-labile essential amino acids methionine and cysteine are not destroyed and so that no undesirable flavor is imparted to the liquid by overcooking.

The pH of the hot liquid is then raised to a pH greater than 8 by adding a dosage of 29.31 milliliters of an alkaline slurry to every liter of the hot liquid by means of a proportioning valve. The alkaline slurry is comprised essentially of:

| Component | | Quantity | Physical State |
| --- | --- | --- | --- |
| Calcium hydroxide | $Ca(OH)_2$ | 79.52 gram | powder, insoluble |
| Sodium hydroxide | NaOH | 39.25 gram | pellet, soluble |
| Potassium phosphate, dibasic, anhydrous | $K_2HPO_4$ | 88.53 gram | powder, soluble |
| Water | $H_2O$ | 1000.00 milliliter | liquid |

A thorough mixing of the liquid and its dose of alkali is achieved and maintained for one minute by passing the liquid/alkaline slurry mixture through an externally insulated, turbulence-inducing pipe which is preferably provided with a twisted ribbon insert. A commercial embodiment of the invention contemplates the use of such a pipe having a diameter of 2" and a length of 65'.

Earlier soy-including bovine milk substitutes are characterized by a yellow-brown color, whereas the inventive process, at this stage thereof, has resulted in a liquid having a light green color. A pH sensor disposed at the discharge of the mixing tube is employed to monitor the pH of the mixture so that a pH greater than 8 can be maintained by varying the dosage of the alkaline slurry if required.

A catalytic reduction column packed with palladium metal guaze or with palladium covered ceramic pellets next receives the liquid. If pellets are used, the column should have a diameter of about 10" and a length of about 6' so that about 10 gallons of liquid can flow therethrough per minute, in that the steps of the novel process described hereinabove, as well as hereinbelow, contemplate such a continuous flow rate. A given droplet of liquid should traverse the length of the column in about four (4) minutes. The temperature of the liquid is maintained at about 80 degrees C. as it traverses the column by means of insulation wrapped about the column, by means of auxiliary heat applied thereto, or by means of a combination thereof, of course. Upon exiting the column, a pH sensor will show that the pH of the liquid is now pH 10, and the color of the liquid will be almost white.

A chemical transformation of the protein is accomplished in the catalytic reduction column. Specifically, passage through the column rapidly and completely converts or changes the amino acids in the liquid from positively charged cations to negatively charged anions. More particularly, the transformation involves the stripping of two hydrogen ions from each amino acid molecule. Such a stripping action, in the absence of a catalyst, would require a reaction time of several hours, after which equilibrium would not be reached for two (2) days. Such a lengthy reaction time is clearly commercially impractical. Moreover, in the absence of a catalyst, the reaction temperatures are sufficiently elevated to degrade the more heat-labile essential amino acids such as methionine-cysteine.

The use of palladium as a catalyst lowers the heat of the reaction of the endothermic reduction reaction (thereby preserving the heat-labile essential amino acids) and shortens the time duration of the reaction to minutes instead of hours. Since less heat is needed for less time, a considerable energy savings is realized.

Even more importantly, the amino acid molecules are now electrically associated with positively charged calcium ions (Ca++), and this is the identical state in which protein is found in bovine milk. Earlier processes for making soy-including bovine milk substitutes have not been able to achieve this duplication of nature.

The reaction achieved so quickly, efficiently, and safely (to the essential amino acids) in the catalytic reduction column converts the amino acids from positively charged cations to negatively charged anions without passing through a bipolar or zwitterion stage. This is a highly desirable feature of the inventive reaction, since amino acids tend to form bipolar or zwitterions in neutral and slightly acidic solutions. Zwitterions tend to clump and form polymer-like chains due to their electrical attraction for each other, which results in degradation of the protein suspension. Clearly, then, by providing a means for achieving a conversion of the amino acids from cations to anions (so that they enter into electrical association with the positively charged calcium ions) without passing through the zwitterion stage, degradation of the protein suspension is avoided entirely.

The reaction which occurs in the column may be viewed in simplified form as follows.

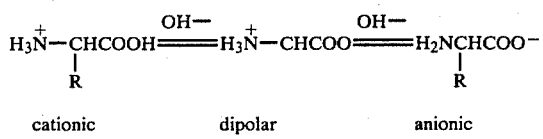

cationic      dipolar      anionic

The equilibrium point of this reaction is different for each amino acid and depends upon the pH of the ambient solution. All of the amino acids may be presumed to exist in anionic form at pH 10, however.

The solution, upon exiting the catalytic reduction column, receives a dose of about 63 grams of corn syrup per liter of solution. This dosage sweetens the solution and adjusts its osmotic pressure and freezing point to more closely resemble the corresponding paramenters of bovine milk.

The solution is then fortified with vitamins and other nutrients contained in a dose of oil slurry automatically controlled to approximately 5.21 grams of oil slurry per liter of solution. The composition of the slurry is as follows:

| Component | Quantity | Physical State |
|---|---|---|
| Coconut oil | 2.69 gram | fat |
| Lecithin | 0.22 gram | gum |
| Wheatgerm oil | 0.90 gram | oil |
| Avicel RC-591* | 1.38 gram | powder, dispersable |
| Alphatocopheryl acetate | 0.02 gram | powder, dispersable |
| Star Vite A&D** | 0.011 milliliter | oil |

*FMC Corp. brand of microcrystalline cellulose with 11% sodium carboxy methylcellulose.
**Star Blends, Inc. Provides 2,000 U.S.P. units of vitamin A palmitate and 400 U.S.P. units of vitamin D₃ per quart when added at 1cc per 100 quarts.

The lecithin and Avicel enhance the miscibility of the three oils (the coconut oil, wheatgerm oil and soy oil, which soy oil comprises 2.5% by weight of the solution). The vitamin E acts as an antioxidant to protect the three oils from degradation during processing and storage.

As mentioned hereinabove, the pH of the solution as it exits the catalytic reduction column is about 12. Concentrated lactic acid is injected in sufficient quantities to lower the pH from 12 to about 7.5. A servomechanism is employed to adjust the quantity of lactic acid as needed to accomplish this desired pH lowering, said servo-mechanism including a pH sensor disposed at the exit of a second homogenizer stage through which the liquid passes after it has first been thoroughly mixed by passing through a centrifugal pump. The second homogenizer stage is preferably a high pressure dairy pipe homogenizer, or a mechanical shear homogenizer.

The solution will now have the same color as bovine milk, as opposed to the yellow-brown tinge commonly associated with soy-including bovine milk substitutes of the prior art. The solution will further have an emulsion of vegetable fat of 3.2% which imparts to the novel soy milk the flavor and creamy texture of bovine milk.

The solution next enters a third accumulator tank. To avoid hydrolysis of the fat by the excess alkali with formation of salts of the fatty acids together with glycerol, the solution is stored for no more than ten (10) minutes at temperature over 50 degrees C. Moreover, to avoid bacterial growth, the solution is stored no more then ten (10) minutes at temperatures between 7–50 degrees C.

Solution stored in accordance with such time and temperature guidelines is then pumped through a HTST Pasteurizer which is set for 95 degrees C. at 5 seconds.

Excess calcium salts and other sludge is then removed by passing the solution through a dairy type clarifier.

The solution is then rapidly cooled to 7 degrees C. by passing it through a plate cooler.

The pH and flow rate of the solution are measured as the solution exits the plate cooler. These measurements determine the amount of lactic acid needed to bring the pH of the solution to 7.1. The pH is checked again by a probe 30 feet downstream. The solution travels from the plate cooler exit to the second pH probe in about 30 seconds.

Where the inventive soy milk is destined for mixing with bovine milk as an extender, the pH of the soy milk is set at pH 7.1 so that the mixture of soy and bovine milk will have a pH of 7.0. Where the inventive soy milk is destined for consumption in unadulterated form, its pH is set at 6.9.

In a commercial embodiment of the inventive process, the product would be stored at 7 degrees C. Preferably, one 10 hour shift would produce 25,000 liters (approximately 7,000 gallons) of soy milk at a flow rate of 40 liters (approximately 10 gallons) per minute, and the production of each shift would be stored in a separate refrigerated silo tank with mechanical agitation and CIP (cleaned in place) equipment.

The mineral content of the product produced by the inventive process compares very favorably with bovine milk and with other soy-including bovine milk substitutes. The following chart shows the grams per liter of the seven (7) minerals contained in bovine milk (as determined by the American Dairy Counsel (ADC), the inventive milk and Soyalac (trademark), a soy-including bovine milk substitute:

| Mineral | ADC | Soy Milk | Soyalac |
|---|---|---|---|
| Na | 0.507g/l | 6.387g/l | <0.349g/l |
| K | 1.56g/l | 4.444g/l | 0.792g/l |
| Ca | 1.23g/l | 3.793g/l | 0.634g/l |
| Mg | 1.39g/l | 0.670g/l | 0.0792g/l |
| P | 0.963g/l | 1.328g/l | 0.528g/l |
| Fe | 0.00051g/l | 4.444g/l | 0.0158g/l |
| Zn | 0.00393g/l | 1.714g/l | 0.00528g/l |

As the chart clearly shows, iron (Fe) is present only in trace amounts in bovine milk and in Soyalac, whereas the soy milk disclosed herein provides nearly 4.5 grams of iron per liter of beverage. A review of the chart shows that the novel soy milk outperforms the other milks in virtually every category of mineral content.

Scientific studies have also shown that bovine milk consists of about 3.07% protein, or 31.6 grams of protein per liter. The novel soy milk has a protein content of 2.85%, or 29.33 grams per liter. The novel soy milk is intended primarily as a bovine milk extender, wherein it would be consumed mixed with equal parts of bovine milk. Such a 50—50 solution has a protein content of 2.96%, or about 30.5 grams per liter.

Bovine milk (of the Holstein breed) has a fat content of about 3%, or 31.0 grams of fat per liter. The corresponding values for the novel soy milk and for a 50—50 mixture of bovine milk and the novel soy milk are 2.62%, 2.81%, and 27.07 grams per liter and 29.04 grams per liter, respectively. Significantly, the fat is in saturated form in bovine milk and in polyunsaturated form in the novel soy milk.

Moreover, independent analysis of small experimental quantities of the novel soy milk have shown it to be free of bacteria, virus, and toxins. Pasteurizing, unfortunately, does not destroy viruses. However, since the novel soy milk is not derived from animals (viruses being parasites and therefore requiring a living animal host for survival), the soy milk disclosed herein is free from the threat of viruses, which possiblitiy is present in bovine milk.

The following chart provides a further comparative analysis of bovine milk, the novel soy milk and the bovine milk/soy milk 50—50 solution*.

| Property | Bovine Milk | Soy Milk | 50-50 Solution |
|---|---|---|---|
| Vitamin A | 2100 I.U.* | 4200 I.U. | 2100 I.U. |
| Vitamin C | 16 mg. | 40 mg. | 20 mg. |
| Vitamin D | 422 I.U.* | 844 I.U. | 422 I.U. |
| Vitamin E | 1 mg. | 20 mg. | 10 mg. |
| Thiamine | 0.4 mg. | Note 1 | Note 1 |
| Riboflavin | 1.6 mg. | Note 1 | Note 1 |
| Niacin | 0.8 mg. | Note 1 | Note 1 |
| Pyridoxine | 0.5 mg. | Note 1 | Note 1 |
| Cholesterol | 1.56 mg. | 0 mg. | 78 mg. |
| Lactose | 51 g. | 0 mg. | 25.5 g. |
| Xanthine Oxidase | 120 mg. | 0 mg. | 60 mg. |
| Lecithin | 39 mg. | 200 mg. | 120 mg. |

*Only when fortified
(NOTE 1: Equal to or greater than corresponding property of bovine milk.)

Infants and children drinking bovine milk often suffer from the effects of mucus accumulation in the sinuses, or curd formation in the stomach. Since bodily secretions or excretions are known to serve the function of discharging toxins from the body, the presence of the non-essential amino acids in bovine milk has become suspect as a possible cause of the mucus and curd build-ups often associated with the consumption of bovine milk. Analysis has shown that the eight (8) essential amino acids comprise only 50.35% of the total amino acid content of bovine milk, whereas the eight (8) essential amino acids comprise 55% of the total amino acid content in the novel soy milk, implying lower levels of the possibly toxic non-essential amino acids.

The calcium/phosphorous ratio provided in the novel soy milk is 3.5/1 where in bovine milk, the same ratio is only 1.2/1. Since the diet of most persons is deficient in calcium, consumption of the novel soy milk in conjunction with a normal diet will produce an overall calcium/phosphorous ratio of about 1.2/1, which is considered the ideal ratio. Bovine milk has this 1.2/1 ratio, but when considered in the context of a typical diet, this low starting ratio for bovine milk results in a diet severely deficient in calcium.

The worldwide demand for bovine milk fluctuates from season to season. Specifically, the demand is highest in winter and lowest in summer. Unfortunately, the supply of bovine milk varies inversely proportional to its demand, being most available in summer and least available in winter. This results in queueing for milk in many parts of the world, especially during the high demand/low supply time of winter. The "excessive" demand accordingly drives up milk prices. The inventive process, on the other hand, is not subject to the vagaries of those of the bovine milk and is therefore capable of eliminating the milk queues and providing a year 'round supply consonant with the year 'round demand.

It will thus be seen that the objects set forth above, and those made apparent by the preceding description, are efficiently attained, and since certain changes may be made in the above process without departing from the scope of the invention, it is intended that all matters contained in the foregoing description shall be interpreted as illustrative and not in a limiting sense.

It is also to be understood that the following claims are intended to cover all of the generic and specific features of the invention which as a matter of language might be said to fall therebetween.

Now that the invention has been described,
That which is claimed is:

1. A process for making a bovine milk substitute or a bovine milk extender, comprising the steps of,
   preparing a predetermined quantity of soy beans for subsequent treatment by soaking the same in water for a predetermined time and then blanching said beans,
   preparing an acidified water solution to provide a source of negatively charged ions for subsequent use in said process,
   introducing said prepared beans and said acidified water solution into a first homogenizer means so that the beans are ground to a substantially uniform state or consistency by said first homogenizer means, so that the protein-containing bean cells are ruptured in the presence of said acidified water solution within said first homogenizer means releasing to the acidified water solution a protein and starch extract to form an extract solution, and so that the amino acids in the proteins released into said acidified water solution by said cell rupturing will be in positively charged form and electrically associated with negatively charged ions supplied by said acidified water solution,
   desludging the extract solution,
   quickly elevating the temperature of the desludged extract solution under boil-preventing pressure to deactivate enzymes,
   thereafter introducing an alkaline compound into the extract solution to increase the pH of the resulting alkaline extract solution and to provide a source of positively charged ions,
   treating the alkaline extract solution by removing a predetermined quantity of hydrogen ions from the positively charged amino acid molecules released into said acidified water solution in said first homogenizer means so that the amino acids in the proteins are converted from positively charged amino acid molecules to negatively charged amino acid molecules so that the resulting anionic-form amino acid ions will enter into electrical association with the positively charged ions provided during said pH increasing step,
   whereby the resulting alkaline extract solution maintains protein in suspension in a form that substantially duplicates the form that protein is maintained in suspension in bovine milk.

2. The process of claim 1, wherein the step of removing said hydrogen ions from said amino acid molecules further comprises passing the alkaline extract solution through a catalytic reduction means so that the desired removal of hydrogen ions is accomplished in an endothermic reaction of short time duration so that the heat-labile amino acids in said alkaline extract solution survive the reaction and so that the amino acids are converted from cations to anions without passing through a zwitterion stage.

3. The process of claim 2, wherein the step of preparing said acidified water solution includes the mixing of water, citric acid, hydrochloric acid and phosphoric acid so that said positively charged amino acids will be in electrical association with negatively charged citrate, cloride and phosphate ions to thereby stabilize said extract solution against protein precipitation, pH changes and bacterial activity.

4. The process of claim 3, wherein the step of increasing the pH of said extract solution with an alkaline compound includes the use of calcium hydroxide as the alkaline compound so that positively charged calcium ions will be available for electrical association with the negatively charged amino acids produced in said endothermic reaction.

5. The process of claim 4, wherein the step of quickly elevating the temperature of the extract solution to a predetermined temperature sufficient to stop enzymatic action and to gelatinize starch in such extract solution prior to increasing the pH of said extract solution with said alkaline compound, and maintaining said elevated temperature for a predetermined time that assures survival of the heat-labile amino acids.

6. The process of claim 5, wherein said step of introducing said beans and said acidified water solutions includes introducing a predetermined quantity of beans and a predetermined proportional amount of said acidified water solution into said first homogenizer means so that the pH of the resulting acidified water solution is greater than 1 and less than 3.5.

7. The process of claim 6, further comprising the step of monitoring the pH and density of the extract solution after it exits said first homogenizer means and using the information collected in said monitoring process to adjust the proportion of beans and acidified water entering into said first homogenizer means so that the pH of the acidified water solution within said first homogenizer means is approximately 1.4 and so that an optimal amount of amino acids are extracted from said ruptured bean cells and so that the extracted amino acids will be in cationic form.

8. The process of claim 7, wherein the step of desludging the extract solution as it exits said first homogenizer means separates cellulose and lignin pulp therefrom and discarding said sludge prior to monitoring the pH and density of extract solution for the purpose of adjusting the proportion at which said beans and acidified water are introduced into said first homogenizer means.

9. The process of claim 8, wherein the step of blanching said beans for a predetermined time prior to introducing said beans into said first homogenizer means inhibits enyzmatic action and substantially removes the bean-like characteristic flavor of said soy beans.

10. The process of claim 4 wherein the step of increasing the pH of said extract solution by using calcium hydroxide further includes the use of sodium hydroxide and potassium phosphate so that the negatively charged amino acids produced by said endothermic reaction will be electrically associated with positively charged calcium, potassium and sodium ions to stabilize the resulting alkaline extract solution.

11. The process of claim 2 wherein the step of passing the alkaline extract solution through a catalytic reduction means includes the use of palladium as a part of said catalytic reduction means.

12. The process of claim 4 wherein the conversion of the positively charged amino acid molecules into negatively charged amino acid molecules is described by the following reaction:

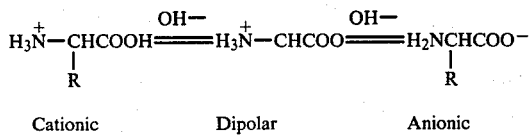

Cationic          Dipolar          Anionic

13. The process of claim 12, further comprising the step of introducing an acid into the alkaline extract solution to adjust the pH of the solution as it exits said catalytic reduction means to a pH between 7 and 8.

14. The process of claim 13, further comprising the step of sweetening the alkaline extract solution as it exits said catalytic reduction means with a nutritive, hypoallergenic sweetener to adjust its osmotic pressure, freezing point and subjective sweetness to closely resemble the corresponding parameters of bovine milk.

15. The process of claim 14, further comprising the step of fortifying the alkaline extract solution with vitamins and other nutrients.

16. The process of claim 15, wherein said fortifying step includes the addition of predetermined quantities of coconut oil, lecithin, wheatgerm oil, microcrystalline cellulose treated with carboxy-methyl cellulose and Vitamins A, D and E, said lecithin and microcrystalline cellulose treated with carboxylmethyl cellulose, enhancing the miscibility of the soy, wheatgerm and coconut oil and said Vitamin E serving to retard oxidation of said oils.

17. The process of claim 16, further comprising the step of introducing the alkaline extract solution into a second homogenizer means after said sweetening and fortifying compounds have been added thereto.

18. The process of claim 17, further comprising the step of monitoring the pH of the alkaline extract solution as it exits said second homogenizer means and feeding back such pH information to vary the amount of acid introduced into the alkaline extract solution as it exits said catalytic reduction means to adjust its pH to approximately 7.5.

19. The process of claim 18, further comprising the step of storing the resulting alkaline extract solution at predetermined times and temperature to avoid saponification of the fat in said alkaline extract solution.

20. The process of claim 19, further comprising the step of passing said stored alkaline extract solution through a pasteurizing means at a predetermined time and temperature, filtering calcium salts and other sludge from said alkaline extract solution and rapidly cooling alkaline extract said solution to about 7° C.

21. The process of claim 20, comprising the step of further adjusting the pH of the alkaline extract solution to about 6.9 for quantities of the alkaline extract solution to be used as a bovine milk substitute and to 7.1 for quantities of the alkaline extract solution to be used as a bovine milk extender.

* * * * *